Patented June 30, 1931

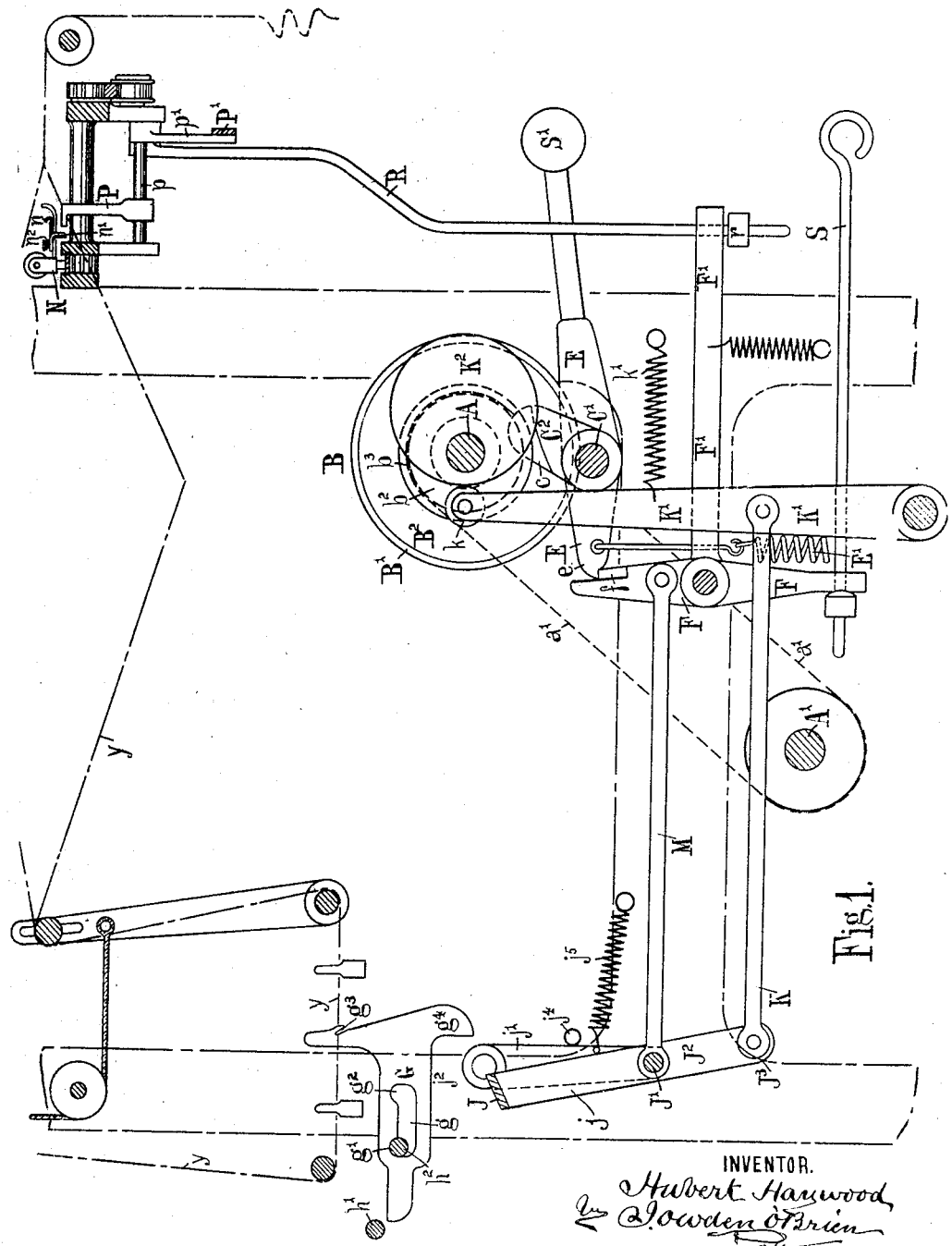

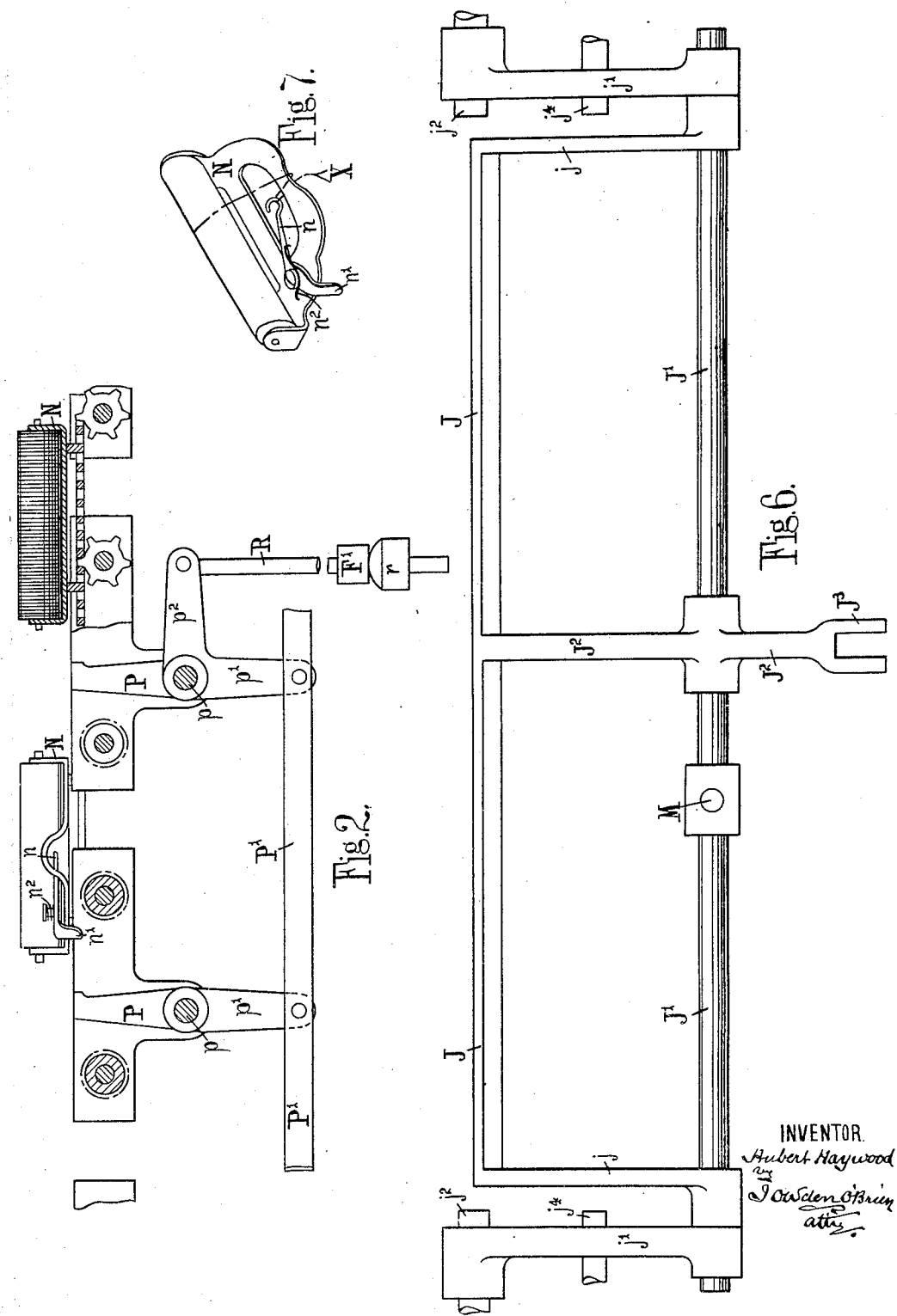

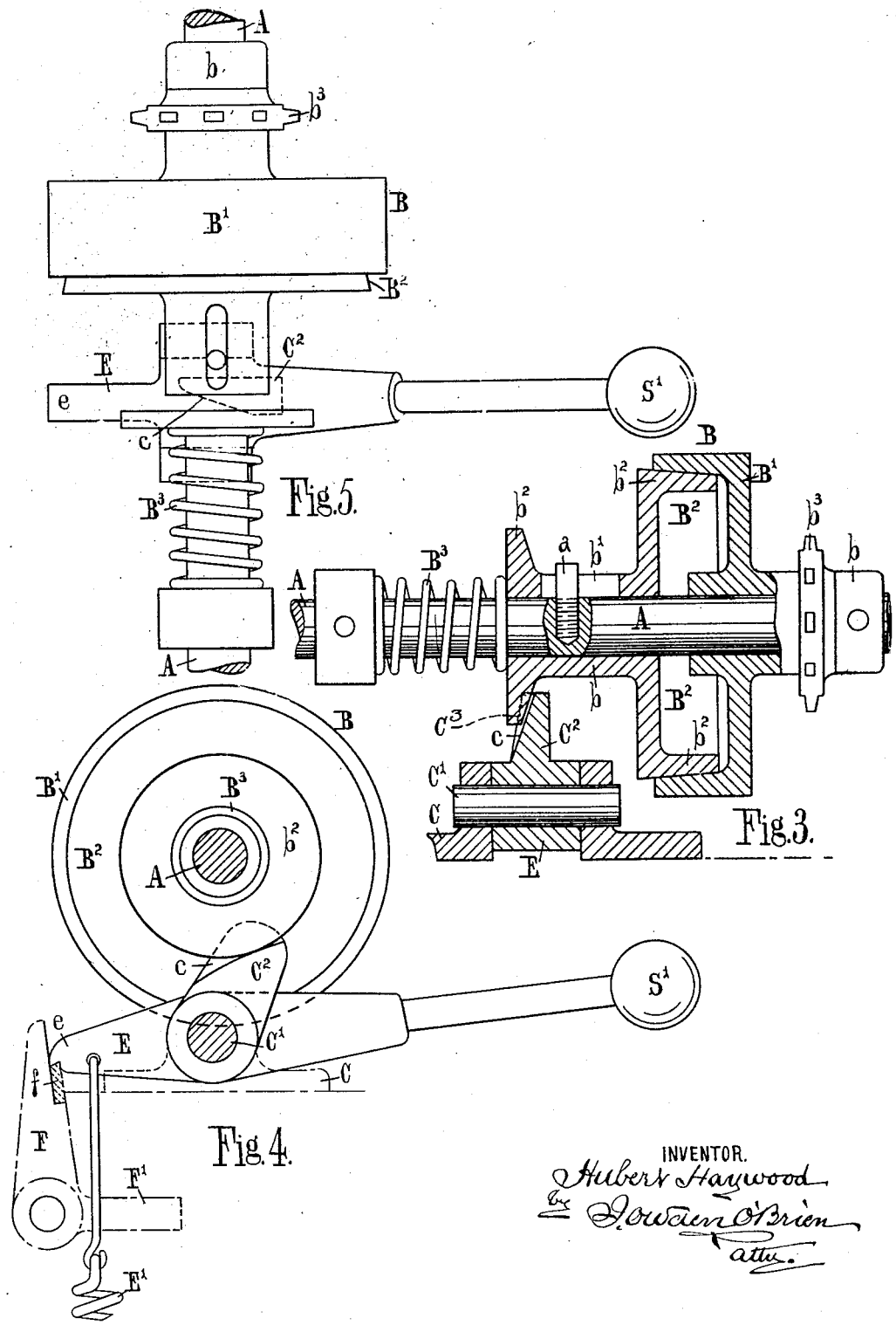

1,812,480

UNITED STATES PATENT OFFICE

HUBERT HAYWOOD, OF WIRKSWORTH, ENGLAND, ASSIGNOR TO THE HAYWOOD NARROW FABRIC LOOM COMPANY LIMITED, OF THE HAGUE, BROADBOTTOM, CHESTER, ENGLAND

DRIVING GEAR OF NARROW FABRIC LOOMS

Application filed September 14, 1929, Serial No. 392,547, and in Great Britain November 10, 1928.

This invention relates to improvements in the driving gear of looms particularly of looms for weaving narrow width fabrics.

According to the invention the loom is driven through clutch mechanism so as to give a smooth and steady starting up and which clutch mechanism is also acted upon by warp and/or weft stop motions so that should a warp or weft thread break or the shuttle become exhausted the clutch mechanism will be disengaged and the loom stopped.

The invention will be described with reference to the accompanying drawings:—

Fig. 1 is a transverse sectional elevation of a loom for weaving narrow width fabrics having the invention applied thereto.

Fig. 2 is a front elevation of part of the loom.

Fig. 3 is a longitudinal section through the clutch mechanism.

Fig. 4 is an end view of same.

Fig. 5 is a plan.

Fig. 6 is a side view of vibrating mechanism forming part of the warp stop motion.

Fig. 7 is a perspective view of shuttle.

The clutch mechanism is mounted on the main driving shaft of the loom or on a counter shaft connected therewith, it being shown in the drawings mounted on a counter shaft A. The clutch B shown in the drawings is of the cone type although a plate or other type of clutch may be employed if desired.

One member, $B^1$ of the clutch is loosely mounted on the shaft A but is prevented from longitudinal movement on the shaft by the collar $b$ which is affixed thereon. The other member $B^2$ of the clutch is affixed to the shaft A by the pin or peg $a$ which passes through a longitudinal slot $b^1$ in the boss of the member $B^2$. The clutch member $B^2$ is thus constrained to rotate with the shaft A but is free to slide longitudinally in relation thereto. The member $B^2$ may be affixed to the shaft A by a key feather or in any other suitable way instead of by the peg $a$ so that it will rotate therewith but be free to slide longitudinally in relation thereto.

The member $B^1$ is continuously driven from the main shaft $A^1$ by a chain $a^1$ which gears with a sprocket wheel $b^3$ on the member $B^1$. Any other suitable drive such as belt or gears may be substituted for the chain drive shown in the drawings.

The sliding member $B^2$ is formed with a sleeve or boss $b$ and a tapered flange $b^2$. A spring $B^3$ bears against the outer face of the flange $b^2$ and normally keeps the two clutch members $B^1$ and $B^2$ in driving engagement with each other.

A bracket C is mounted on the frame of the loom below the clutch and carries a rocking shaft $C^1$ on which is affixed an arm $c^2$ the upper portion $c$ of which is chamfered or bevelled. When the clutch member $B^2$ is in the driving position and the rocking arm $c^2$ is in its normal position the bevelled portion $c$ is clear of the tapering flange $b^2$ but on rotation of the rocking arm $C^2$ the unbevelled portion $c^3$ of the arm $C^2$ comes into engagement with the tapering face of the flange $b^2$ and moves the member $B^2$ along the shaft against the pressure of the spring $B^3$ so that the two clutch members are disconnected and the loom is stopped.

The movement of the rocking arm $C^2$ is controlled by both a warp stop motion and a weft stop motion so that should a warp thread break or a weft thread break or a shuttle become exhausted the loom will be stopped. A horizontal lever E is formed integrally with the arm $C^2$ or may be formed separately therefrom and be affixed on the rocking shaft $C^1$ carrying the arm $C^2$ and during the normal running of the loom a projection $e$ on the end of the lever engages a catch $f$ on the upper end of a three armed pivoted lever F being held in contact therewith by the spring $E^1$. Thus as long as there is no movement of the lever F the lever E is held in its normal position and the arm $C^2$ remains out of contact with the tapering flange $b^2$ of the clutch member $B^2$. Should however the lever F be moved about its pivot the catch $f$ will be moved from under the end of the lever E and the spring will pull down the lever E causing the shaft $C^1$ to rotate and the arm $C^2$ to move the clutch member $B^2$ out of engagement with the member $B^1$. The lever F is connected through suitable mechanism which will be hereinafter described so that on the breaking or absence of a warp or weft thread the arm F will be operated to release the horizontal arm E.

A sinker G is suspended from each warp thread $y$. The sinker G is of the shape shown in Fig. 1 being provided with a slot $g$ having enlarged ends $g^1$, $g^2$ adapted to engage one or the other of two bars $h^1$, $h^2$ arranged longitudinally at the back of the loom. The normal position of the sinker is as shown with the slot in engagement with the front bar $h^2$ and with the recess $g^3$ engaging with the warp thread $y$. The number of sinkers G provided for each head of the loom is equal to the maximum number of warp threads that will be employed and if in the weaving of fabric less warp threads are employed, the surplus sinkers are suspended from the rear bar $h^1$ clear of the stop motion mechanism.

The front of each sinker G is formed with a downwardly projecting finger $g^4$ which when the recess $g^3$ is engaged by the warp thread $y$ is out of the path of a vibrating bar J carried on two arms $j$ but which when the yarn breaks will fall down into the path of the bar J. The arms $j$ carrying the bar J are pivotally mounted on a shaft $J^1$ mounted in the arms $j^1$ pivoted on studs or short shafts $j^2$ affixed to the frame of the loom. The centre lines of shafts $j^2$ are approximately in the same horizontal plane as the top edge of the bar J and the arms $j^1$ are held against stops $j^4$ by springs $j^5$. A lever $J^2$ affixed to the bar J and pivotally mounted on the shaft $J^1$ is formed at its lower end $J^3$ and a connecting rod K is pivotally connected to the end $j^3$. The other end of the connecting rod K is pivotally connected to a lever $K^1$ pivoted on the frame of the loom. A roller $k$ is mounted on the upper end of the lever $K^1$ and engages a cam $K^2$ mounted on the shaft A. A spring $k^1$ holds the roller $k$ in engagement with the face of the cam $K^2$. The shaft $J^1$ on which the arms $j^1$ carrying the bar J are mounted, carries one end of a connecting rod M, the other end of which is pivotally connected to the lever F.

During the normal working of the loom the bar J is oscillated from the arm K moving about the shaft $J^1$ on which the rod M is mounted so that no movement is imparted to this rod. On the breaking of a warp thread however, the sinker G suspended from such thread falls and the downwardly projecting finger $g^4$ comes into the path of the oscillating bar J preventing movement thereof. As however the lever $K^1$ continues to be oscillated by the cam $K^2$ the thrust on the rod K will cause the lever $J^2$, shaft $J^1$ and arms $j^1$ to pivot about the shafts $j^2$ but as the edge of the bar J coincides with the centre line of the shaft $j^2$ there will be no undue pressure exerted by the bar J on the sinker G.

The movement of the shaft $J^1$ will be communicated through the rod M to the lever F and the catch $f$ on the latter will be moved from under the end of the lever E so that the end of this lever will be pulled down by the spring $E^1$ and the clutch members $B^1$ and $B^2$ disengaged as previously described.

A thread guide $n$ is pivotally mounted on each shuttle carrier N and the weft thread $x$ passes around the guide $n$ after leaving the shuttle. The guide $n$ is provided with a depending finger $n^1$ and the guide is controlled by a light spring $n^2$ which is not sufficient to overcome the tension of the yarn on the guide but which when the yarn breaks or the shuttle is exhausted will rotate the guide so that the finger $n^1$ will move into such a position that it will come into contact with the upper end of a pivoted arm P as the shuttle carrier N reaches the end of its stroke.

A pivoted arm P is provided for each shuttle carrier of the loom and each arm P is mounted on a short shaft $p$. Each short shaft also carries a downwardly depending lever $p^1$ the ends of all the levers $p^1$ being connected together by a bar $P^1$ so that when one arm P is moved, the movement is communicated to all the arms.

One of the levers $p^1$ is in the form of a bell crank lever to the horizontal arm $p^2$ of which, a long connecting rod R is pivotally affixed. The connecting rod R extends downwards and its lower end passes through the outer end of the horizontal members $F^1$ of the three armed lever F. A nut $r$ is screwed on the lower end of the rod R and engages with the underside of the arm $F^1$ so that when the rod R is raised the lever F will be oscillated and moved out of engagement with the end of the lever E thus causing the clutch members $B^1$ and $B^2$ to be disconnected as previously described.

When a weft thread $x$ breaks or is absent through exhaustion of the shuttle the corresponding thread guide $n$ is moved by its spring $n^2$ so that the finger $n$ will engage the top of the arm P causing the latter to pivot. The movement of the arm P is conveyed through the lever F and bar $P^1$ to the bell crank lever $p^1$, $p^2$ and the oscillation of the latter raises the connecting rod R and thereby causes the stoppage of the loom.

In order that the loom may be stopped at any time by the operator a rod S extending to the front of the loom is affixed to the bottom of the lever F so that by pulling the rod S forward the upper end of the lever F is moved from under the end of the lever E and the two clutch members $B^1$ and $B^2$ disengaged.

The lever E is provided with a handle $S^1$ for starting the loom, after it has been stopped. The depression of the handle $S^1$ causes the lever E to rotate with the shaft $C^1$ and the arm $C^2$ to rock so that its bevelled face is moved away from the tapering flange $b^2$, thus allowing the spring $B^3$ to bring the two clutch members $B^1$ and $B^2$ into engagement.

The movement of the lever E also allows the catch $f$ on lever F to be brought under the end $e$ of the lever E so that both the warp and weft stop motions can be reset.

What I claim as my invention and desire to protect by Letters Patent is:—

1. In a loom for weaving narrow width fabrics the combination with a driving shaft, of a driven shaft, one member of a friction clutch mechanism affixed on said driving shaft to rotate therewith but free to slide thereon, a second member of the friction clutch mechanism mounted on said driving shaft so that it can rotate thereon, means for preventing the second clutch member from sliding on said driving shaft, gearing connecting the second clutch member with the driven shaft, a spring normally pressing the two clutch members together, a rocking arm which when rotated separates the two clutch members to stop the loom, a warp stop motion which actuates the rocking arm on breakage of a warp yarn and weft stop motion which also actuates the rocking arm on breakage of a weft yarn or on exhaustion of a shuttle.

2. In a loom for weaving narrow width fabrics the combination with a driving shaft of a driven shaft, one member of a friction clutch mechanism affixed on said driving shaft to rotate therewith but free to slide thereon, a second member of the friction clutch mechanism mounted on said driving shaft so that it can rotate thereon, means for preventing the second clutch member from sliding on said driving shaft, gearing connecting the second clutch member with the driven shaft, a spring normally pressing the two clutch members together, a rocking arm which when rotated separates the two clutch members to stop the loom, a spring controlled lever which actuates the rocking arm, a pivoted lever which normally holds the spring controlled lever from engagement with the rocking arm, a warp stop motion which releases the spring controlled lever on breakage of a warp yarn and a weft stop motion which releases the spring controlled lever on breakage of a weft yarn on exhaustion of the shuttle.

3. In a loom for weaving narrow width fabrics the combination with a driving shaft, of a driven shaft, one member of a friction clutch mechanism affixed on said driving shaft to rotate therewith but free to slide thereon, a second member of the friction clutch mechanism mounted on said driving shaft so that it can rotate thereon, means for preventing the second clutch member from sliding on said driving shaft, gearing connecting the second clutch member with the driven shaft, a spring normally pressing the two clutch members together, a rocking arm which when rotated separates the two clutch members to stop the loom, a spring controlled lever which actuates the rocking arm, a pivoted lever which normally holds the spring controlled lever from engagement with the rocking arm, a warp stop motion which releases the spring controlled lever on breakage of a warp yarn, a weft stop motion which releases the spring controlled lever on breakage of a weft yarn on exhaustion of a shuttle, and a hand operated lever which releases the spring controlled lever when the operator desires to stop the loom.

4. In a loom for weaving narrow width fabrics the combination with a driving shaft, of a driven shaft, one member of a friction clutch mechanism affixed on said driving shaft to rotate therewith but free to slide thereon, a second member of the friction clutch mechanism mounted on said driving shaft so that it can rotate thereon, means for preventing the second clutch member from sliding on said driving shaft, gearing connecting the second clutch member with the driven shaft, a spring normally pressing the two clutch members together, a rocking arm which when rotated separates the two clutch members to stop the loom, a spring controlled lever which actuates the rocking arm, a pivoted lever which normally holds the spring controlled lever from engagement with the rocking arm, a sinker suspended from each warp thread, a vibrating bar into the path of which a sinker falls on breakage of a warp thread and prevents oscillation thereof, pivoted arms carrying said vibrating bar, links connecting said arms with the pivoted lever so that when the movement of the vibrating bar is arrested the pivoted lever is moved to release the spring controlled lever, a weft stop motion which releases the spring controlled lever on breakage of a weft yarn on exhaustion of a shuttle, and a hand operated lever which releases the spring controlled lever when the operator desires to stop the loom.

In testimony whereof I have hereunto set my hand.

HUBERT HAYWOOD.